(No Model.)
J. R. BOICE.
BICYCLE TIRE.
No. 581,506.                              Patented Apr. 27, 1897.
Fig. 1.
Fig. 2.
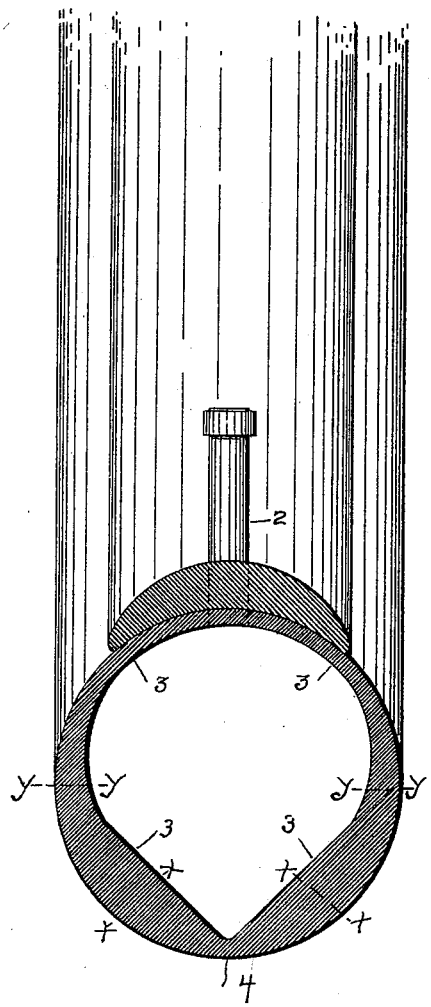
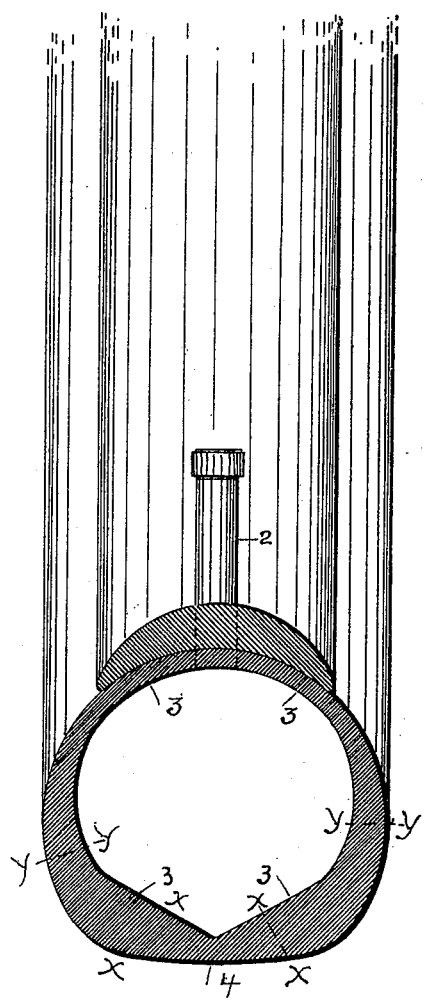
WITNESSES
H. H. Martin
Maud Schumacher
INVENTOR
John R. Boice
By William Webster
Atty

UNITED STATES PATENT OFFICE.

JOHN R. BOICE, OF TOLEDO, OHIO.

BICYCLE-TIRE.

SPECIFICATION forming part of Letters Patent No. 581,506, dated April 27, 1897.

Application filed January 23, 1897. Serial No. 620,396. (No model.)

*To all whom it may concern:*

Be it known that I, JOHN R. BOICE, of Toledo, county of Lucas, and State of Ohio, have invented certain new and useful Improvements in Bicycle-Tires; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a bicycle-tire, and has for its object to provide a maximum traction with the greatest amount of resiliency under pressure, with a provision to guard against puncture to a degree to allow of egress of the air contained within the tire.

The invention consists in a tire normally circular in cross-section upon its periphery, with an interior air-chamber practically semicircular in cross-section upon the inner interior and apexed toward the tread portion, whereby the immediate contact-point of the tread portion is of a like thickness with that of the inner portion bearing upon the rim, with reinforced sides extending from the tread portion radially to a point approximating the horizontal center of the inner tube and decreasing to form a flexible thinner bearing for the rim of the wheel.

I have discovered that in the formation of the tire in accordance with my invention in allowing a practically flexible tread reinforced radially, or, in other words, immediately from this point by gradual increased thickness of rubber, the action is, first, to allow of the proper traction, supplemented by a rigidity due to the reinforcements, and, second, a compression of the rubber at the point of traction sufficient to repel a tendency to puncture, or if subjected to a puncture to effect an immediate closure of the puncture, with reinforced sides of a thickness to exceed any ordinary degree of puncture that may be effected. I have found, further, that with the provision of a practically normally provided tread and a radial reinforcement immediately therefrom upon each side extending to approximately midway the diameter of the tire with a decreasing thickness to a minimum of the area of the rim I have secured a compensatory resiliency, due to the weight of the rider, to obviate the effect of ordinary unevenness of the road or track traveled.

In the drawings, Figure 1 is a cross-sectional view of a tire constructed in accordance with my invention. Fig. 2 is a like view showing the tire under normal compression.

1 designates the tire, formed of rubber or usual material, circular in cross-section upon the outer periphery and formed with an interior for inflation by air through the ordinary valve 2. The interior of the tire is formed with abrupt reinforcements 3 upon each side, decreasing from the point $x$ $x$ toward the tread portion 4 to a degree to render the immediate tread portion 4 of practically the ordinary thickness and also decreasing from the points $x$ $x$ radially to approximately the horizontal center of the tire, as at $y$ $y$, and from the upper semicircular portion above the lines $y$ $y$ rapidly decreasing to cause a thickness at the bearing-point $z$ $z$ of the rim to be of approximately the usual thickness, or, in other words, of a like thickness with the tread portion 4.

It will be readily seen, especially by reference to Fig. 2, that the weight upon the wheel causes a compression of the tread portion 4, slightly increasing its thickness, and that the reinforcements 3 supplement the tread portion at this point and if in contact with any puncturable substance are of a thickness to receive the same without (unless of extreme length) its passing through these portions. The compression of the tread portion 4 renders the body of the tire at this particular point of a density to practically withstand an ordinary puncturable substance, or if such substance is received immediately closes the puncture by reason of the pressure of the reinforcements 3 3.

The gradually-diminishing portion of the upper semicircular portion of the tire in cross-section is of a resiliency to compensate for any impact occasioned by unevenness of the road.

What I claim is—

1. A tire normally circular in cross-section with an interior air-chamber practically semicircular upon the interior, and apexed internally toward the tread portions, by abrupt internal reinforcements terminating at the tread portion.

2. A tire approximately circular in exterior conformation with a thin bearing-surface for engagement with the rim of the wheel, and a tread portion of approximately the same thickness and internal reinforcements extending from the tread portion at an obtuse angle and decreasing toward the smaller diameter of the tire.

In testimony that I claim the foregoing as my own I affix my signature in presence of two witnesses.

JOHN R. BOICE.

Witnesses:
WILLIAM WEBSTER,
MAUD SCHUMACHER.